Dec. 3,486,130
RING LASER HAVING A QUARTER WAVE PLATE FOR ROTATING THE PLANE
OF POLARIZATION OF LIGHT WHICH IS REFLECTED BACK INTO
THE RING FROM THE COMBINING OPTICS
Filed Sept. 20, 1966
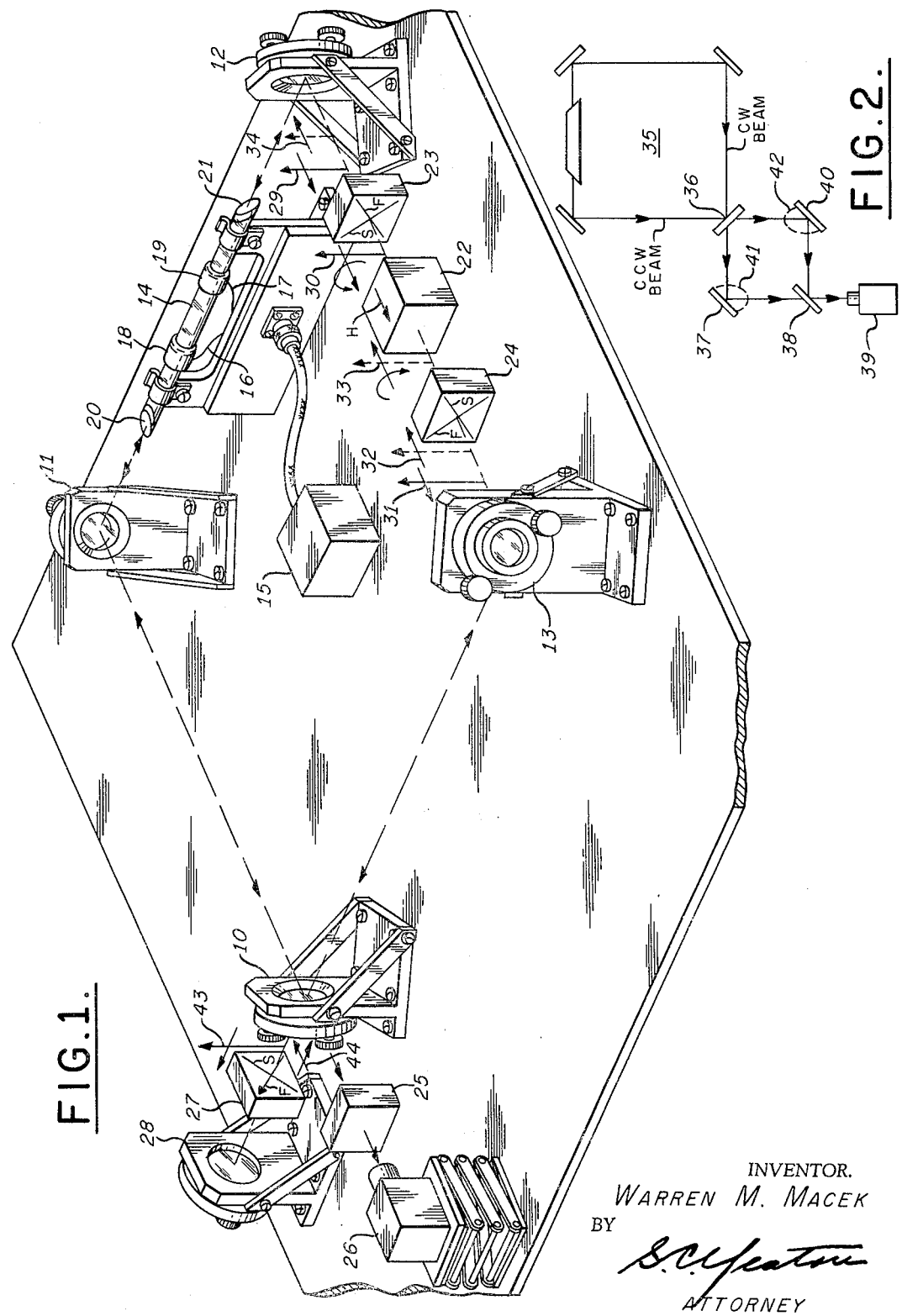
INVENTOR.
WARREN M. MACEK
BY
*S.C. Yeaton*
ATTORNEY United States Patent Office 3,486,130
Patented Dec. 23, 1969

3,486,130
RING LASER HAVING A QUARTER WAVE PLATE FOR ROTATING THE PLANE OF POLARIZATION OF LIGHT WHICH IS REFLECTED BACK INTO THE RING FROM THE COMBINING OPTICS
Warren M. Macek, Huntington, N.Y., assignor to Sperry Rand Corporation, a corporation of Delaware
Filed Sept. 20, 1966, Ser. No. 580,772
Int. Cl. G01j 3/46
U.S. Cl. 331—94.5                           7 Claims

ABSTRACT OF THE DISCLOSURE

A ring laser arranged and constructed to support oppositely propagating identically plane polarized light beams, said laser including a partially transmissive corner mirror for extracting a portion of the energy in each beam from the ring. A quarter waveplate and a reflecting member positioned in the path of one of the extracted beams operate in conjunction with the partially transmissive corner mirror to convert said one extracted beam to an orthognal polarization and direct it onto a heterodyning mechanism in collinear relationship with the other extracted beam.

This invention relates to ring lasers and more particularly to means for reducing coupling between the contradirectional coherent light beams propagating in the ring laser.

A ring laser comprises a laser source located in a planar optical cavity formed by three or more highly reflective corner members which direct oppositely propagating light beams emitted by the source around a closed loop path. Any active lasing medium may be used as the laser source but a lasing gas mixture enclosed in a hollow tube has been preferred because of ease in operating such lasers in a continuous wave fashion in the present state of the art. Brewster angle windows are generally used to seal the ends of the hollow tube and determine the polarization of the light waves emitted from the source although other conventional sealing and polarizing means have also been employed. The optical cavity oscillates at those frequencies for which the closed loop optical path length corresponds to an integral number of light beam wavelengths. Therefore, when their optical path lengths are identical, the contradirectional light beams oscillate at the same frequency but for unequal path lengths they oscillate at distinct frequencies separated by an amount proportional to the difference in their path lengths. Rotation of the ring laser about an axis perpendicular to the plane of the closed loop paths is one way of establishing differential path lengths. In this instance the light beam propagating in the direction of rotation must travel a greater distance to arrive back at its starting point in the closed loop path while the oppositely directed beam travels a correspondingly shorter distance. Consequently, the light beam propagating in the direction of ring rotation oscillates at a lower frequency than it did in the absence of rotation because a longer wavelength satisfies the requirement for oscillation. Likewise, the light beam propagating opposite to the direction of rotation oscillates at a higher frequency.

The rotational rate or differntial path length is customarily measured by extracting from the ring a small portion of the energy in each light beam by partial transmission through one of the corner members. Combining means external to the ring render the extracted components collinear and direct them to a photodetector wherein they are heterodyned to produce a beat frequency signal proportional to the difference between the frequencies of the light beams. The beat frequency is linearly related to rotation rate for relatively fast rotation but as the rate decreases the relationship eventually becomes non-linear because of coupling, that is, a mutual interaction, between each light beam and a backscattered component of the oppositely propagating beam. Backscattering is always present to some degree but it is effective to produce coupling only at comparatively low rototional rates. Moreover, the coupling usually becomes more pronounced as the optical path length is decreased. When the rotation rate is diminished even further, the coupling ultimately becomes strong enough to cause abrupt cessation of the beat frequency as a result of the contradirectional beams becoming synchronized at the same frequency. This frequency synchronizing phenomenon is referred to as mode locking and the corresponding beat frequency or rotational rate at which it occurs is called the mode locking threshold. Prior art ring lasers have therefore frequently included means for circumventing the mode locking problem such as a light propagating device which exhibits different propagation constants for light beams having some distinct characteristic difference. One example of such a device is an electro-optic birefringent material having orthogonal principal axes wherein plane polarized light waves aligned parallel to the respective principal axes propagate at different velocities. As a result a nominal differential path length and corresponding beat or bias frequency is established for the heterodyned light beams even when the ring is stationary. Rotation then either raises or lowers the beat frequency from its nominal value depending upon the sense of rotation. The dynamic operating range of the ring laser as a rotation sensing instrument is thus determined by the difference between the nominal bias frequency and the mode locking threshold. Unfortunately, the birefringent biasing member and the accompanying components which establish orthogonality between the polarization orientation of the contradirectional plane polarized beams produce additional backscattering thereby raising the mode locking threshold even higher and reducing the dynamic operating range proportionately.

It is known that for coupling to occur the backscattered component of one light beam and the oppositely propagating light beam must be identically polarized. Moreover, it has been observed that the highly coherent light beams emitted by a laser are only slightly depolarized when they are backscattered by a reflecting member. As a result most of the energy in the backscattered light retains its original polarization and the propensity for coupling is therefore enhanced if the contradirectional light beams initially have the same polarization. Inasmuch as the Brewster angle windows at the ends of the laser tube permit essentially all of the plane polarized light having a prescribed polarization to propagate through the laser medium the condition for coupling exists. Nevertheless, the mode of operation is generally desired because it assures that the optical path lengths of the contradirectional beams will not be affected by either strain in the Brewster angle windows or random time varying birefringence of the laser source. It is also compatible with the additional requirement that the beams should preferably be plane polarized either parallel or perpendicular to the plane of the ring to avoid distortion, that is, ellipticity of the polarization, in the light beams reflected from the corner members. Accordingly, the light beams are usually polarized and oriented in the aforesaid preferred manner over all portions of the light path except in the region of the biasing members.

When the contradirectional light beams are identically plane polarized, the external combining means may be a predominant cause of backscattering depending on the manner in which it is constructed. A combining means comprising a plurality of reflecting and beam splitting members, for example, does not cause deleterious backscattering since only an infinitesimal part of the energy extracted from the ring for measuring purposes is transmitted back into the ring. Alternatively, a simple combining means, consisting of only one reflecting member operating in conjunction with the corner member at which the cavity energy is extracted, aggravates the mode locking problem because a portion of the extracted energy in one of the beams is transmitted back into the ring such that it couples to the oppositely propagating beam. Nevertheless, since the simple combiner is easier to construct and adjust, it would be used in preference to a more elaborate combiner if the coupling it causes could be eliminated. The mode locking threshold is considered too high for many applications, however, even without the additional coupling caused by a simple combiner. For this reason the more elaborate combining means comprising a plurality of components has generally been employed with ring lasers.

It is a principal object of the invention, therefore, to provide a ring laser utilizing a simple combiner including means for reducing the coupling caused by the simple combiner.

Another object of the invention is to provide a ring laser which utilizes a simple combiner and has a reduced mode locking threshold.

Another object of the invention is to provide a ring laser utilizing a simple combiner wherein the contradirectional light beams propagating in the ring are identically plane polarized so that they are not differentially affected by either time varying birefringence of the active lasing medium or strain effects in the polarization determining members located at each end of the lasing medium.

A further object of the invention is to provide a ring laser utilizing a simple combiner which establishes orthogonality between the polarizations of one of the contradirectional light beams propagating in the cavity and a component of the oppositely propagating beam which is reflected back into the ring by the simple combiner.

These and other objects, as will appear from a reading of the following specification, are achieved in the present invention by the provision of a light beam combining means comprising a single reflecting member, a polarization converter and a polarization analyzer. A part of the energy in each of the identically plane polarized contradirectional light beams is extracted from the laser cavity by transmission through one of the cavity corner members. One of the extracted light beams passes through the polarization converter and impinges on the single reflecting member at normal incidence whereupon it is reflected back through the polarization converter onto the corner member at which it was extracted from the cavity. The double passage through the polarization converter makes the light orthogonally polarized. A small part of the orthogonally polarized light beam is transmitted through the extracting corner member back into the laser cavity where it propagates opposite to its original direction of travel. The remaining portion of the orthogonally polarized light energy is reflected from the corner member through the polarization analyzer onto a photodetector. The other contradirectional light beam extracted from the laser cavity passes directly through the polarization analyzer onto the photodetector in collinear relationship with the horizontally polarized light beam. The transmission axis of the polarizaion analyzer is aligned at an angle of 45 degrees with respect to the two orthogonally polarized light beams so that similarly oriented plane polarized components of each light beam are transmitted to the photodetector.

For a more complete understanding of the present invention, reference should be made to the following detailed specification and the accompanying drawings wherein:

FIG. 1 is a perspective view of a preferred embodiment of the invention; and

FIG. 2 is a plan view of a prior art light beam combiner mechanism utilized with ring lasers.

Referring to FIG. 1, a planar, rectangular optical resonant cavity is formed by corner mirrors 10, 11, 12 and 13. A tube 14 containing an active lasing medium such as the standard helium-neon gas mixture is disposed between two adjacent corner mirrors. The gas mixture is energized by R.F. generator 15 operating in the range of 20 megacycles per second to 30 megacycles per second, the output signal from the R.F. generator being connected by leads 16 and 17 to the ring electrodes 18 and 19 located near the ends of the tube. Optical flats 20 and 21, which seal the ends of tube 14, are inclined at Brewster's angle relative to the longitudinal axis of the tube to function as polarizers that transmit plane polarized light oriented perpendicular to the plane of the optical cavity, such light hereinafter being referred to as vertically polarized. Light beams emitted from each end of tube 14 are successively reflected from each corner mirror causing them to propagate in opposite directions around a common circulatory path wherein they oscillate at the same frequency when their optical path lengths are equal. Since the vertically polarized light is normal to the plane of incidence the oscillatory light beams retain their polarization upon being reflected from the corner mirrors. The same performance is obtained for plane polarized light having a polarization orientation orthogonal to the vertically polarized light, such orthogonally oriented plane polarized light hereinafter being referred to as horizontally polarized. For any other orientation the plane polarized light becomes elliptically polarized upon reflection from the corner mirrors with the result that its horizontally polarized component is strongly attenuated when the light beam re-enters the lasing medium. For this reason the plane polarized contradirectional light beams are usually vertically or horizontally polarized and preferably identically polarized particularly when passing through the laser medium in order to eliminate the possibility of differential path lengths being produced by either time varying birefringence in the gas mixture or strain in the Brewster angle optical flats as might occur if they were not identically oriented. When the closed loop path lengths are made unequal as by rotation about an axis perpendicular to the plane of the laser cavity, the contradirectional light beams oscillate at different frequencies. Because of the aforementioned mode locking problem, however, it is often desired that differential closed loop path lengths should exist even in the absence of rotation. This not only circumvents the coupling problem but also permits the determination of the sense of any other differential path length disturbances.

One specific means for providing a differential circulatory path length comprises a magneto-optic birefringent member 22 located between circular polarizers 23 and 24. The circular polarizers are quarter wave optical plates constructed of a naturally birefringent material such as crystalline quartz having orthogonal principal axes F and S oriented normal to the direction of propagation of the contradirectional light beams. Plane polarized light beams polarized parallel to the F axis propagate through the circular polarizers with greater velocity than light beams polarized parallel to the S axis. The thickness of the circular polarizer parallel to the direction of light propagation is such that orthogonal plane polarized light beams which are in time phase and aligned with the principal axes upon entering the circular polarizer are 90 degrees out of time phase upon emerging therefrom so that the emerging light is circularly polarized. To obtain light beam components parallel to both the F and S axes the circular polarizers are oriented with their principal axes at an angle of 45 degrees relative to the vertically polarized light beam. The vertically polarized CW light beam 29 transmitted through optical flat 21 emerges from circular polarizer 23 as left-handed circular polarized light represented by vector 30; a CCW rotating light vector looking against the direction of light propagation being designated as left-handed circularly polarized and a similarly observed CW rotating light vector being designated as right-handed circularly polarized.

The principal axes of circular polarizer 24 are rotated 90 degrees relative to the principal axes of circular polarizer 23 and its thickness parallel to the direction of light propagation is the same as that of circular polarizer 23. Consequently, when the left-handed circularly polarized CW light beam propagates through circular polarizer 24 it is converted to vertically polarized light represented by vector 31. Likewise, the vertically polarized CCW light beam represented by dashed vector 32 is converted by circular polarizer 24 to left-handed circularly polarized light represented by dashed vector 33 and then by circular polarizer 23 to vertically polarized light represented by dashed vector 34. The magneto-optic birefringent member 22 is constructed of glass or other material known to exhibit the classical Faraday effect. A magnetic field H which is applied to the birefringent member parallel to the direction of light propagation by a permanent or electrical magnet (not shown) causes it to exhibit different indices of refraction to the circularly polarized waves that have opposite sense of rotation relative to the direction of the magnetic field. Although both the CW and CCW beams are left-hand circularly polarized, their polarization vectors rotate in opposite directions relative to the direction of the magnetic field. This causes the closed loop optical path length to be different for the oppositely propagating light beams with the result that they oscillate at different frequencies.

The difference between the frequencies of the contradirectional light beams is measured by transmitting a part of the energy in each beam through corner mirror 10 to a combiner mechanism which renders the transmitted beams collinear for application to a photodetector wherein they are heterodyned to produce a beat frequency proportional to the difference between the frequencies of the light beams. In the prior art combiner mechanism of FIG. 2 the CW light beam extracted from laser cavity 35 by partial transmission through corner mirror 36 is reflected from mirror 37 and partially transmitted through beam splitter 38 onto photodetector 39. The portion of the CCW light beam which is extracted from the laser cavity is reflected from mirror 40 onto beam splitter 38 where it is partially reflected onto photodetector 39 in collinear relationship with the extracted CW beam. The extracted light beams impinging on mirrors 37 and 40 are essentially entirely specularly reflected onto beam splitter 38 but a small part of the energy in the extracted light beams is diffusely reflected or scattered as shown at 41 and 42. The components of the diffusely reflected light which are directed back toward corner mirror 36 are partially transmitted into the laser cavity wherein they travel opposite to their original direction of propagation. The amount of such light fed back into the cavity is infinitesimal, however, and therefore has negligible effect in coupling the contradirectional light beams.

Referring again to FIG. 1, in the combiner mechanism employed with the present invention, the CW light beam is extracted from the laser cavity by partial transmission through corner mirror 10 so that it propagates through polarization converter 27 and impinges upon mirror 28 at normal incidence whereupon it is reflected back through the polarization converter to corner mirror 10. At corner mirror 10 most of the energy in the extracted CW light beam is reflected through analyzer 25 onto photodetector 26 but a considerable portion is transmitted back into the laser cavity where it propagates opposite to its original direction of travel. The CCW beam which is extracted from the cavity by partial transmission through corner mirror 10 is transmitted directly through analyzer 25 onto photodetector 26 in collinear relationship with the extracted CW light beam. Since the polarization converter 27 makes the vertically polarized CW beam extracted from the cavity horizontally polarized, the light beams impinging on analyzer 25 are orthogonally polarized. The transmission axis of the analyzer is therefore positioned so that approximately equal amplitude identically polarized components of the extracted light beams are applied to the photodetector.

In the absence of polarization converter 27, the part of the extratced CW light beam which is transmitted back ino the cavity has the same polarization orientation as the contradirectional light waves propagating therein. Consequently, it is transmitted along with the CCW light beam through optical flat 21 into the lasing medium wherein it becomes coupled to the CCW beam to produce the aforementioned non-linear operation and resultant mode locking. Polarization converter 27 which is a quarter wave optical plate similar to polarization converters 23 and 24 converts the extracted vertically polarized CW light beam represented by vector 43 to circularly polarized light which after reflection from mirror 28 passes back though polarization converter 27 and becomes horizontally polarized as represented by vector 44. The polarization conversion is accomplished by aligning the polarization converter with its principal axis at an angle of 45 degrees with respect to the vertically polarized light beam. Although the horizontally polarized light is partially transmitted into the laser cavity it is precluded from entering the lasing medium by optical flat 21 and therefore does not couple to the CCW beam.

It should be recognized that other well known reflecting or refracting elements may be used in place of the corner mirrors and a part or all of the optical path lengths may be curved or made non-planar if desired. In addition, the gaseous lasing medium may be excited by a D.C. power source or other known lasing media may be employed.

What is claimed is:
1. A ring laser device comprising:
 (a) means for forming a closed loop optical cavity,
 (b) a lasing medium for generating light beams propagating in opposite directions in said optical cavity,
 (c) means disposed in said cavity for rendering the oppositely propagating beams plane polarized in a prescribed orientation,
 (d) means for extracting from said optical cavity a portion of the energy in each of said oppositely propagating light beams to provide non-collinear identically plane polarized extracted light beams,
 (e) combining means including a polarization converter and a reflective member disposed such that one of said extracted beams propagates through said polarization converter and impinges on said reflective member whereupon it is reflected back through said polarization converter and becomes orthogonally polarized relative to said extracted beams so that the portion of said orthogonal beam which re-enters said optical cavity is not coupled to either of the oppositely directed waves propagating therein, said combining means also being operative to align said orthogonal beam and the other of said extracted beams in collinear relationship, and
 (f) means for heterodyning said orthogonal beam and said other extracted beam.
2. The apparatus of claim 1 further including means for establishing a difference in the optical cavity path lengths for said oppositely propagating light beams.
3. The apparatus of claim 1 wherein
 (a) said optical cavity forming means includes at least one partially transmissive member for providing said extracted light beams,
 (b) said reflective member is disposed normal to the path of said one extracted beam propagated through said partially transmissive member and said polarization converter is positioned between said partially transmissive member and said reflective member for converting said one extracted beam to circularly polarized light upon passing therethrough in the direction from said partially transmissive mirror to said reflective member and then to said orthogonal beam upon passing through said polarization converter in the opposite direction, and (c) said heterodyning means comprises a photodetector and a polarization analyzer having its transmission axis aligned at an angle of 45 degrees with respect to the polarization orientation of said orthogonal beam and said other extracted light beam.

4. The apparatus of claim 3 wherein
(a) said partially transmissive member is a corner member of said optical cavity, and
(b) said polarization converter is a quarter wave optical plate.

5. The apparatus of claim 4 wherein
(a) said optical cavity has a planar, polygonal shape, and
(b) said optical cavity forming means comprises reflecting members positioned in the path of said oppositely propagating light beam at each corner of said polygon.

6. The apparatus of claim 5 wherein
said means for rendering the oppositely propagating beams plane polarized comprises optical flats positioned at each end of said laser medium and canted at Brewster's angle with respect to the longitudinal axis of said lasing medium.

7. The apparatus of claim 6 wherein
said optical flats are arranged to orient said oppositely propagating plane polarized light beams relative to the plane of the cavity at a prescribed angle such that the polarization of said oppositely propagating light beams is not distorted by said reflecting members.

References Cited

UNITED STATES PATENTS

| | | | |
|---|---|---|---|
| 3,323,411 | 6/1967 | Killpatrick | 356—106 |
| 3,346,319 | 10/1967 | Billings | 350—150 |

JEWELL H. PEDERSEN, Primary Examiner

E. BAUER, Assistant Examiner

U.S. Cl. X.R.

350—150, 157; 356—106